(12) United States Patent
Fujiwara et al.

(10) Patent No.: US 11,621,778 B2
(45) Date of Patent: Apr. 4, 2023

(54) OPTICAL COMMUNICATION SYSTEM AND OPTICAL COMMUNICATION METHOD

(71) Applicant: NIPPON TELEGRAPH AND TELEPHONE CORPORATION, Tokyo (JP)

(72) Inventors: Masamichi Fujiwara, Musashino (JP); Ryo Igarashi, Musashino (JP); Takuya Kanai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/596,339

(22) PCT Filed: Jun. 11, 2019

(86) PCT No.: PCT/JP2019/023105
§ 371 (c)(1),
(2) Date: Dec. 8, 2021

(87) PCT Pub. No.: WO2020/250305
PCT Pub. Date: Dec. 17, 2020

(65) Prior Publication Data
US 2022/0239375 A1 Jul. 28, 2022

(51) Int. Cl.
*H04B 10/291* (2013.01)
*H04B 10/272* (2013.01)

(52) U.S. Cl.
CPC ......... *H04B 10/291* (2013.01); *H04B 10/272* (2013.01); *H04B 10/2916* (2013.01)

(58) Field of Classification Search
CPC . H04B 10/291; H04B 10/2916; H04B 10/272
(Continued)

(56) References Cited

U.S. PATENT DOCUMENTS

| 5,136,420 A | 8/1992 | Inagaki et al. |
| 5,138,483 A | 8/1992 | Grasso et al. |

(Continued)

FOREIGN PATENT DOCUMENTS

| CN | 1713550 A | * 12/2005 | ......... H04B 10/2916 |
| JP | H0325985 A | 2/1991 | |

(Continued)

OTHER PUBLICATIONS

Derek Nesset and Paul Wright, "Raman Extended GPON using 1240 nm Semiconductor Quantum-Dot Lasers". 2010 Conference on Optical Fiber Communication (OFC/NFOEC). Mar. 21, 2010.

(Continued)

*Primary Examiner* — Abbas H Alagheband

(57) ABSTRACT

An optical communication system having an optical transmission line, where a first section of the optical transmission line is connected to a first optical communication device; and a second section of the optical transmission line is connected to a second optical communication device. The optical communication system further includes: a Raman light source; an incident device connected to same end of the second section of the optical transmission line as the second optical communication device; and a separating device interconnecting the first section of the optical transmission line to the second section of the optical transmission line. The incident device causes excitation light output from the Raman light source to be incident to the second section of the optical transmission line and performs distributed Raman amplification on the optical signal; and the separating device separates the excitation light that is caused to be incident by the incident device.

6 Claims, 6 Drawing Sheets

(58) Field of Classification Search
USPC .......................................................... 398/173
See application file for complete search history.

(56) References Cited

U.S. PATENT DOCUMENTS

| | | | | |
|---|---|---|---|---|
| 6,342,965 | B1* | 1/2002 | Kinoshita | H01S 3/06758 359/341.1 |
| 8,238,751 | B1* | 8/2012 | Iannone | H04J 14/025 385/24 |
| 2002/0063948 | A1* | 5/2002 | Islam | H04B 10/25253 359/334 |
| 2002/0114060 | A1* | 8/2002 | Kobayashi | H04B 10/298 359/341.44 |
| 2002/0140927 | A1* | 10/2002 | Sobe | G01M 11/3154 356/73.1 |
| 2003/0117692 | A1* | 6/2003 | Tanaka | H04B 10/2916 359/334 |
| 2007/0177874 | A1* | 8/2007 | Kashima | H04J 14/005 398/77 |
| 2008/0089692 | A1* | 4/2008 | Sorin | H04J 14/02 398/135 |
| 2011/0243559 | A1* | 10/2011 | Grobe | H04B 10/2939 398/58 |
| 2012/0224168 | A1* | 9/2012 | Hirai | H04B 10/071 356/73.1 |
| 2012/0224253 | A1* | 9/2012 | Kobayashi | H04B 10/2916 359/334 |
| 2015/0249314 | A1* | 9/2015 | Onaka | H04B 10/298 359/342 |

FOREIGN PATENT DOCUMENTS

| | | | | |
|---|---|---|---|---|
| JP | H03166782 | A | | 7/1991 |
| JP | H09179152 | A | | 7/1997 |
| JP | H11215171 | A | | 8/1999 |
| JP | 200160921 | A | | 3/2001 |
| JP | 2002221743 | A | * | 8/2002 ......... H04B 10/2916 |
| JP | 2004157234 | A | * | 6/2004 ......... H04B 10/2916 |
| JP | 2007208747 | A | | 8/2007 |
| JP | 2011147024 | A | | 7/2011 |

OTHER PUBLICATIONS

Derek Nesset et al. "Bidirectional, Raman Extended GPON with 50 km Reach and 1:64 Split Using Wavelength Stabilised Pumps". 37th European Conference and Exhibition on Optical Communication. Jul. 27, 2011.

Mark D. Feuer et al., "Backreflection and Loss in Single-Fiber Loopback Networks". IEEE Photonics Technology Letters. vol. 12, No. 8, 2000. pp. 1106-1108.

Hiroshi Takahashi et al. "Impact of Crosstalk in an Arrayed-Waveguide Multiplexer on NxN Optical Interconnection". IEEE Journal of Lightwave Technology. vol. 14, No. 6, 1996. pp. 1097-1105.

* cited by examiner

OPTICAL COMMUNICATION SYSTEM AND OPTICAL COMMUNICATION METHOD

CROSS-REFERENCE TO RELATED APPLICATIONS

This application is a 371 U.S. National Phase of International Application No. PCT/JP2019/023105 filed on Jun. 11, 2019. The entire disclosures of the above applications are incorporated herein by reference.

TECHNICAL FIELD

The present invention relates to an optical communication system and an optical communication method.

BACKGROUND ART

A PON (Passive Optical Network) system standardized by IEEE (Institute of Electrical and Electronics Engineers) and ITU-T (International Telecommunication Union Telecommunication Standardization Sector) is widely used for an optical subscriber system. FIG. 3 is a diagram illustrating a configuration example of a PON system 90. The PON system 90 has a system configuration in which a transceiver arranged in a station building 910 and a transceiver of each of a plurality of subscribers is coupled by one access optical fiber 950 via an optical splitter 940 arranged outside the building. For example, the transceiver installed in the station building 910 is an OLT (Optical Line Terminal) 911, and the transceiver of the subscriber is an ONU (Optical Network Unit) 930. The direction from the OLT 911 to the ONU 930 is downstream, and the direction from ONU 930 to OLT 911 is upstream.

In the same access optical fiber 950, an upstream signal and a downstream signal are transmitted bidirectionally using different wavelengths. The downstream signal transmitted through the access optical fiber 950 is a continuous signal in which signals for each subscriber are multiplexed using time division multiplexing (TDM) technology. The ONU 930 arranged in the subscriber's house extracts and receives a signal of a time slot assigned to the subject device from the continuous signal split by the optical splitter 940. On the other hand, the upstream signal transmitted through the access optical fiber 950 is a burst signal intermittently transmitted from the ONU 930. The burst signal transmitted from each ONU 930 is coupled by the optical splitter 940 to become a TDM signal, which is sent to the OLT 911 of the station building 910. In the PON system 90, the access optical fiber 950 from the station building 910 to the optical splitter 940 and the OLT 911 arranged in the station building 910 can be shared by a plurality of subscribers. Therefore, it is possible to economically provide a high-speed optical line service exceeding Giga bps.

The PON system is widely introduced in Japan. However, since there is a concern that it will be difficult to secure workers to maintain the system as the population declines in the future, there is a strong demand for a significant reduction in operation associated with maintenance. As a means for solving this problem, it is expected to realize a technology for extending the reach of the PON system.

FIG. 4 is a diagram illustrating a configuration of a PON system 91 in which the reach of the PON system 90 that provides an optical line service according to the configuration of FIG. 3 is extended. In FIG. 4, the same parts as those of the PON system 90 illustrated in FIG. 3 are designated by the same reference numerals. In this example, a case in which the OLT 911 arranged in the station building 910 in the PON system 90 illustrated in FIG. 3 is removed, and an OLT 921 arranged in a station building 920 on the higher layer than the station building 910 accommodates ONUs 931 arranged in each subscriber's house will be considered.

As the OLT 921 arranged in the station building 920, the OLT 911 arranged in the station building 910 may be used, or a new OLT may be used. Further, the original ONU 930 may be used as the ONU 931 arranged in each subscriber's house, or may be replaced with a new ONU. An optical fiber transmission line of the PON system 91 includes an access optical fiber 950 used by the PON system 90, which provides the optical line service according to the configuration illustrated in FIG. 3, and a relay optical fiber 960 connecting the station building 910 and the station building 920. If this system configuration can be realized, the OLT 911, which is an active device that requires power supply, can be excluded from the station building 910, and the failure rate in the station building 910 can be significantly reduced. As a result, when the OLT fails, it is possible to eliminate the operation of a maintenance person rushing to the station building 910 for maintenance work.

However, the optical transmission line loss significantly increases due to the extension of the optical fiber transmission line. Therefore, a new optical transmission technique capable of compensating for this increased optical transmission line loss is required. Since cost reduction is strongly required for access systems, it is desirable to suppress the increase in the number of optical components. In addition, in order to realize a high power budget, it is desirable to devise something on the station building side rather than the subscriber side. The first possible method to achieve a high power budget while minimizing the increase in the number of optical components is to arrange a post-optical amplifier at the output of an optical transmitter of an optical transceiver mounted in the OLT and arrange a pre-optical amplifier in front of an optical receiver. However, when upstream signal transmit is performed using such a method, an optical signal whose intensity is greatly attenuated in the optical transmission line is input to the pre-optical amplifier. The signal-to-noise ratio (SNR) of the received optical signal deteriorates greatly due to the influence of the amplified spontaneous emission (ASE) noise emitted by the optical amplifier. Therefore, there is a problem that the extension effect of the power budget deteriorates significantly as compared with the downstream signal transmission in which a strong output of the optical transmitter is input.

In order to solve this problem, a method that uses distributed Raman amplification for upstream signal transmission has been proposed (see, for example, NPLs 1 and 2). FIG. 5 is a diagram illustrating a PON system 92 that uses distributed Raman amplification. In FIG. 5, the same parts as those of the PON system 91 illustrated in FIG. 4 are designated by the same reference numerals. As illustrated in FIG. 5, a Raman light source 922 for distributed Raman amplification of an upstream signal is arranged in the station building 920. Since a wavelength multiplexer/demultiplexer 923 causes the excitation light output from the Raman light source 922 to be incident to an optical fiber transmission line 970, the upstream signal is amplified by backward excitation. According to this method, since the optical fiber transmission line 970 is used as an amplification medium, the signal is amplified before the strength of the upstream signal is significantly attenuated by the transmission line loss. Therefore, the influence of ASE noise emitted in the process of Raman amplification can be relatively reduced, and the SNR of the received signal can be improved. As a result, a higher power budget is realized than when a pre-optical amplifier is used for the optical receiver input. Therefore, it can be expected that the power budget improvement effect in the upstream signal transmission will be close to the power budget improvement effect by the post-optical amplifier in the downstream signal transmission.

On the other hand, the optical fiber transmission line 970 of FIG. 5 includes the access optical fiber 950 and the relay optical fiber 960 illustrated in FIG. 4. The problem here is the presence or absence of reflection points in the optical fiber transmission line. A signal light is reflected at a reflection point, and when the reflected light is reflected again at another reflection point and travels in the same direction as the original signal light, the reflected light becomes interference noise with respect to the original signal light. This interference noise deteriorates the SNR of the received signal. The reflection point mentioned therein is a connection point that connects optical fibers. Reflection points are those that can cause large reflections, such as optical connectors and mechanical splices. On the other hand, the fusion splice is not a reflection point because the reflection at the connection point is extremely small. Since the relay optical fiber 960 is formed by fusion splicing, there is almost no reflection point. On the other hand, the access optical fiber 950 has many reflection points such as optical connectors and mechanical splices.

In the system configuration of FIG. 3, there are many connection points serving as reflection points, and some of these connection points may have a reflectance r of a certain size. However, in the access optical fiber 950, since the ratio of the double-reflection light to the original signal light is reduced to r², the influence of the interference noise is negligibly small. However, when the excitation light for distributed Raman amplification is incident to an optical fiber transmission line having a connection point such as the access optical fiber 950, the reflected light is Raman-amplified between the connection points. Assuming that the amplification factor is g, the ratio of the double-reflection light to the original optical signal increases to g²r². Due to this increase, for example, when the optical fiber transmission line 970 is used as an amplification medium as illustrated in FIG. 5, there is a high possibility that the influence of interference noise at the time of reception is not negligible. In fact, the relay optical fiber has few connection points and has a low loss, whereas the access optical fiber has a large number of connection points such as optical connectors and mechanical splices (for example, NPL 3) and has a very large loss.

FIG. 6 is a diagram illustrating a calculation result of a power penalty occurring when double reflection occurs due to the presence of reflection points. The power penalty is measured when a signal having a mark ratio of 1/2 is received at the optimal discrimination point, and is obtained by Formula (1) below described in NPL 4.

[Formula 1]

$$\text{Penalty [dB]} = -10 \log(1 - \sigma_{RIN}^2 Q^2) \quad (1)$$

Here, the Q value was set to 7 assuming error-free (corresponding to a bit error rate of $10^{-12}$). Further, since NPL 3 describes that even if the loss ($\alpha$) at the reflection point is only 0.2 dB, reflection near the reflectance of −15 dB may occur, the value of $\alpha$ is set to 0.2 dB. The relative intensity noise $\sigma^2$ when there is no gain between the reflection points is given by Formula (2) below, and the relative intensity noise $\sigma^2$ when there is a gain between the reflection points is given by Formula (3) below. A Raman amplification gain g between reflection points was assumed to be 3 dB.

[Formula 2]

$$\sigma_{RIN}^2 = \frac{\alpha}{r^2} \quad (2)$$

[Formula 3]

$$\sigma_{RIN}^2 = \frac{\alpha}{g^2 r^2} \quad (3)$$

As mentioned above, considering the case where the reflectance is −15 dB, the power penalty is only 0.2 dB when there is no gain between the reflection points, whereas the power penalty increases to 0.85 dB, which is not negligible, when a gain of 3 dB is generated between the reflection points. Therefore, it is not practical to apply distributed Raman amplification to such an access optical fiber. On the other hand, in NPLs 1 and 2, the excitation light is incident to a 50 km single mode optical fiber (SMF) in which there is no distinction between an access optical fiber and a relay optical fiber. Here, it cannot be considered that a long-reach PON system utilizing an existing access optical fiber as illustrated in FIG. 4 is assumed. In other words, it is presumed that it is assumed that a new optical fiber having no connection point is laid between a station building and subscribers to provide a new service to an area where an optical line service is not provided.

CITATION LIST

Non Patent Literature

[NPL 1] Derek Nesset, Paul Wright, "Raman Extended GPON using 1240 nm Semiconductor Quantum-Dot Lasers", 2010 Conference on Optical Fiber Communication (OFC/NFOEC), OThW6, 2010.

[NPL 2] Derek Nesset, Kristan Farrow, Paul Wright, "Bidirectional, Raman Extended GPON with 50 km Reach and 1:64 Split Using Wavelength Stabilised Pumps", 37th European Conference and Exhibition on Optical Communication, Th. 12. C. 1, 2011.

[NPL 3] Mark D. Feuer, Mikkel A. Thomas, Leda M. Lunardi, "Back reflection and Loss in Single-Fiber Loopback Networks", IEEE Photonics Technology Letters, Vol. 12, No. 8, pp. 1106-1108, 2000.

[NPL 4] Hiroshi Takahashi, Kazuhiro Oda, Hiromu Toba, "Impact of Crosstalk in an Arrayed-Waveguide Multiplexer on N×N Optical Interconnection", IEEE Journal of Lightwave Technology, Vol. 14, No. 6, pp. 1097-1105, 1996.

SUMMARY OF THE INVENTION

Technical Problem

In the long-reach PON system utilizing an existing access optical fiber laid to provide an optical line service, a connection point that can be a reflection point is present in an optical fiber transmission line. In the long-reach PON system, although the optical transmission line loss increases due to the extension of the optical fiber transmission line, since such a connection point is present, it is difficult to apply the technique of NPL 3 to Raman-amplify optical signals.

In view of the above circumstances, an object of the present invention is to provide an optical communication system and an optical communication method capable of providing an optical line service by utilizing an existing access optical fiber.

Means for Solving the Problem

An aspect of the present invention is an optical communication system in which a first optical communication device and a second optical communication device transmit and receive an optical signal via an optical transmission line, the optical transmission line including: a first section optical transmission line connected to the first optical communication device; and a second section optical transmission line connected to the second optical communication device and having fewer reflection points of the optical signal than the first section optical transmission line, and the optical communication system including: a light source; an incident portion that causes excitation light output from the light source to be incident to the second section optical transmission line and performs distributed Raman amplification on the optical signal; and a separating portion that separates the excitation light that is caused to be incident by the incident portion and transmitted through the second section optical transmission line in a direction of the first section optical transmission line.

An aspect of the present invention is an optical communication method in an optical communication system in which a first optical communication device and a second optical communication device transmit and receive an optical signal via an optical transmission line, the optical transmission line including: a first section optical transmission line connected to the first optical communication device; and a second section optical transmission line connected to the second optical communication device and having fewer reflection points of the optical signal than the first section optical transmission line, and the optical communication system including: an incident step of causing excitation light output from a light source to be incident to the second section optical transmission line and performing distributed Raman amplification on the optical signal; and a separating step of separating the excitation light that is caused to be incident in the incident portion and transmitted through the second section optical transmission line in a direction of the first section optical transmission line.

Effects of the Invention

According to the present invention, it is possible to provide an optical line service by utilizing an existing access optical fiber.

DESCRIPTION OF EMBODIMENTS

Hereinafter, an optical communication system and an optical communication method according to the embodiment of the present invention will be described in detail with reference to the drawings. In the following, a case where the optical communication system is a PON system will be described as an example.

First Embodiment

Figure 1:
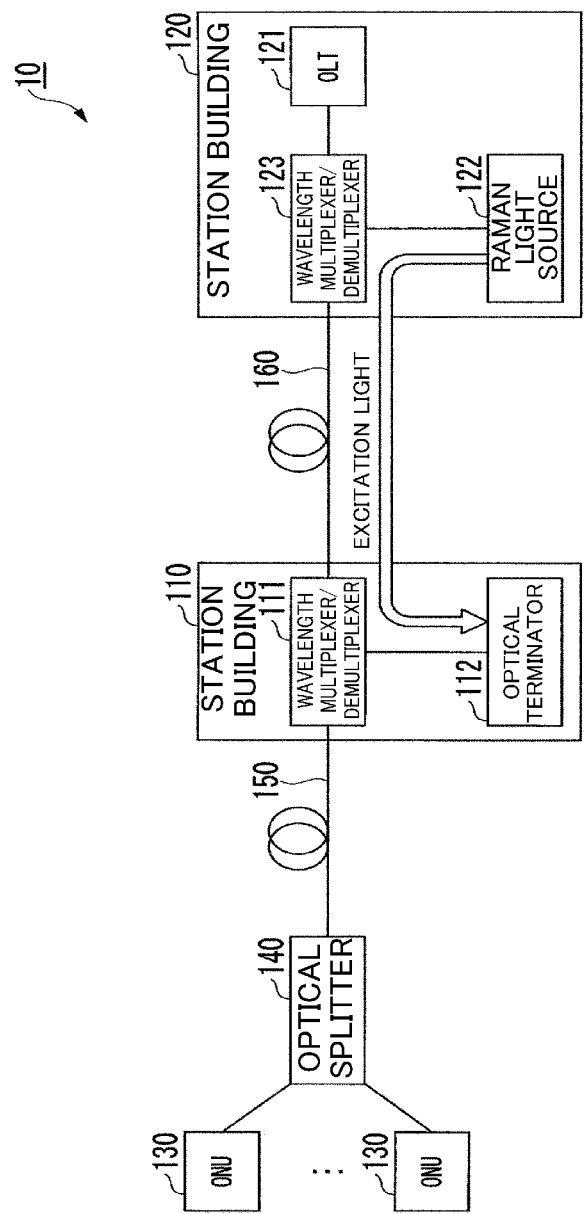
FIG. 1 is a diagram illustrating a configuration of a PON system according to a first embodiment of the present invention.
Figure 3:
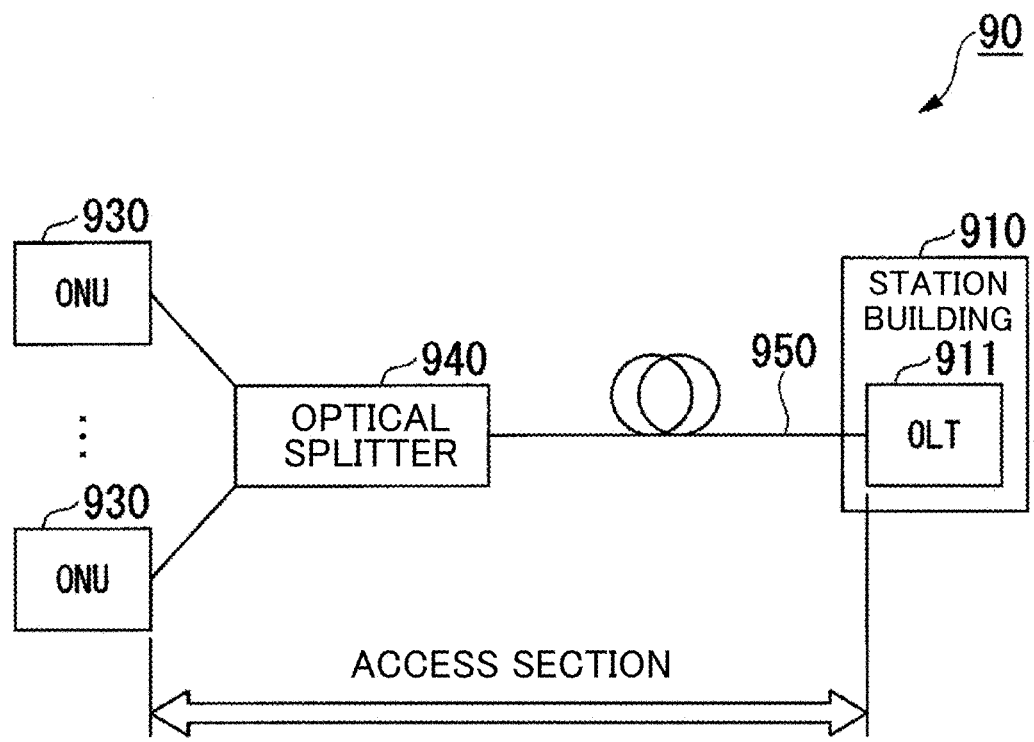
FIG. 3 is a diagram illustrating a configuration of a PON system according to a conventional technique.
Figure 4:
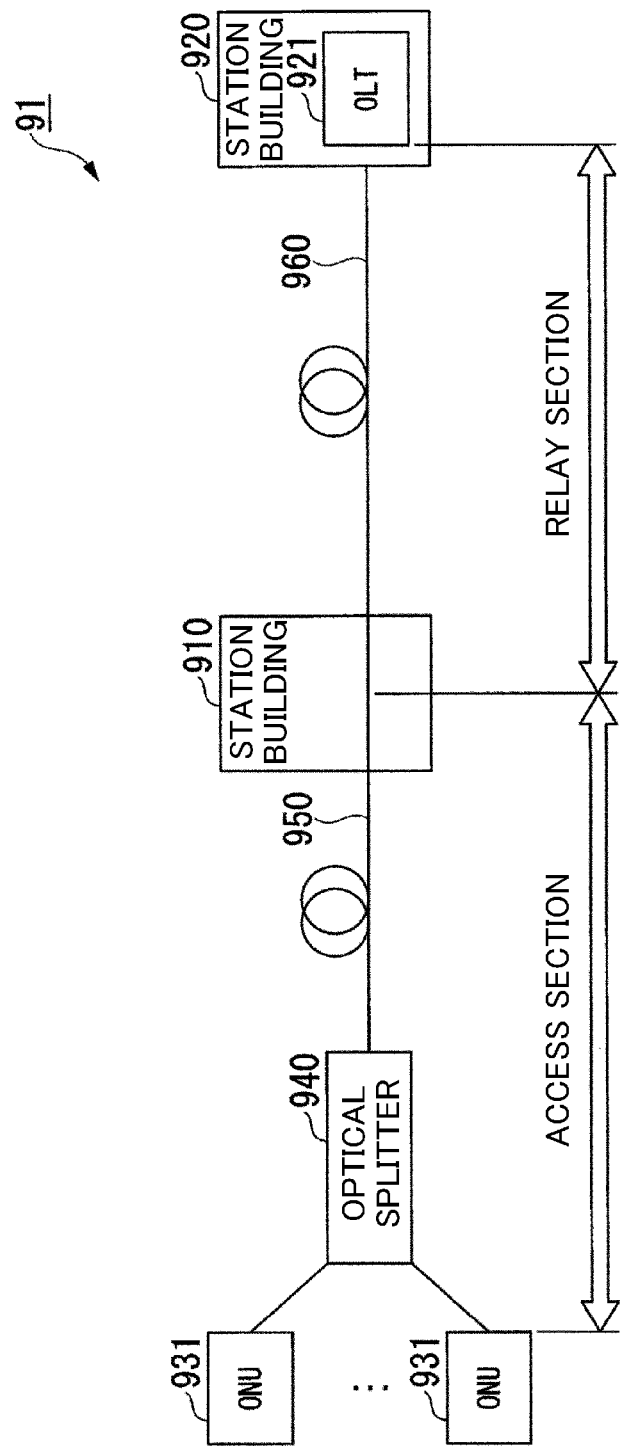
FIG. 4 is a diagram illustrating a configuration of a long-reach PON system according to a conventional technique.
Figure 5:
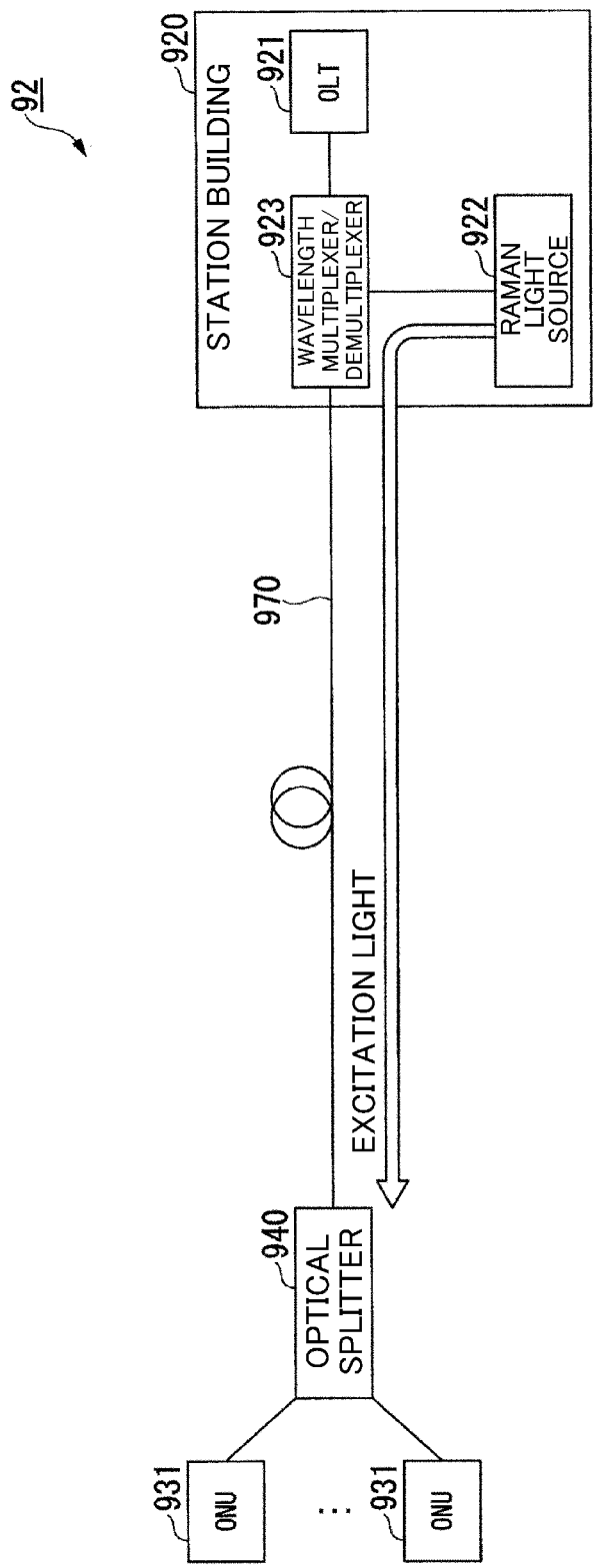
FIG. 5 is a diagram illustrating a configuration of a PON system which uses distributed Raman amplification according to a conventional technique.
Figure 6:
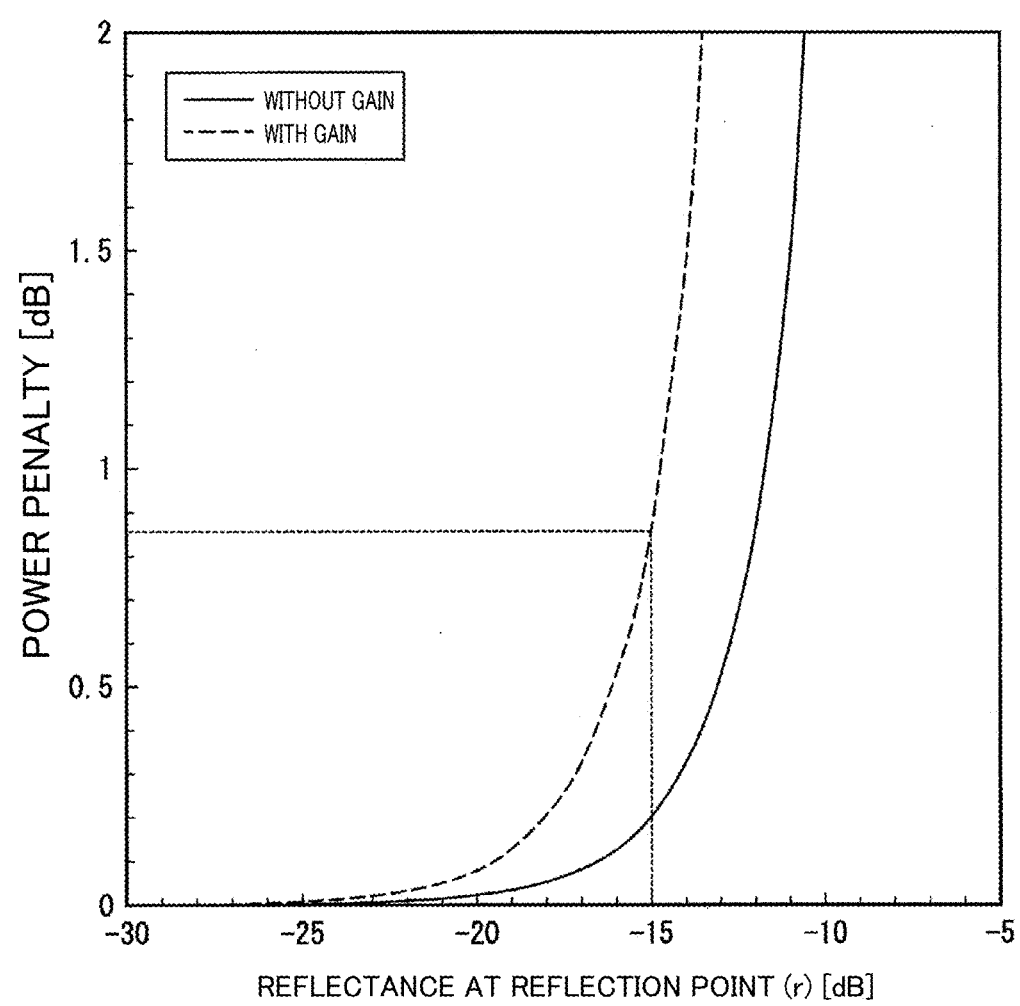
FIG. 6 is a diagram illustrating a calculation result of a power penalty that occurs when double reflection occurs.

FIG. 1 is a diagram illustrating a configuration of a PON system 10 according to a first embodiment of the present invention. The PON system 10 is a long-reach PON system. As in FIG. 4, the PON system 10 extends the reach of a PON system by utilizing the existing access optical fiber 950 laid to provide an optical line service by the PON system 90 illustrated in FIG. 3, for example. A station building 110, a station building 120, an OLT 121, an ONU 130, an optical splitter 140, an access optical fiber 150, and a relay optical fiber 160 of the PON system 10 correspond to the station building 910, the station building 920, the OLT 921, ONU 931, the optical splitter 940, the access optical fiber 950, the relay optical fiber 960 of the PON system 91 illustrated in FIG. 4, respectively.

A wavelength multiplexer/demultiplexer 111 and an optical terminator 112 are arranged in the station building 110 or in the vicinity of the station building 110 where the original OLT (corresponding to the OLT 911 illustrated in FIG. 3) connected to the access optical fiber 150. In some cases, the station building 110 may be removed due to the reach extension. The OLT 121, a Raman light source 122, and a wavelength multiplexer/demultiplexer 123 are arranged in the station building 120. The wavelength multiplexer/demultiplexer 123 is installed between the OLT 121 and the relay optical fiber 160. The wavelength multiplexer/demultiplexer 111 is connected to the relay optical fiber 160 and the access optical fiber 150. The optical splitter 140 arranged outside the building is connected to the access optical fiber 150 and the plurality of ONUs 130. The access optical fiber 150 has many connection points serving as reflection points, such as optical connectors and mechanical splices. Since the relay optical fiber 160 is formed by fusion splicing, the reflection at the connection point is extremely small, and the relay optical fiber 160 has a smaller number of reflection points of the optical signal than the access optical fiber 150.

The OLT 121 arranged in the station building 120 outputs a multiplexed downstream signal using TDM technology. An optical fiber transmission line including the relay optical fiber 160 and the access optical fiber 150 transmits the downstream signal output by the OLT 121. The optical splitter 140 receives the downstream signal transmitted through the relay optical fiber 160 and the access optical fiber 150, and splits the received downstream signal to the plurality of ONUs 130. The ONU 130 arranged in the subscriber's house receives the continuous signal split by the optical splitter 140 and extracts and receives the signal of the time slot assigned to the subject device from the received continuous signal.

On the other hand, each ONU 130 transmits an upstream signal. The upstream signal transmitted from the ONU 130 is a burst signal transmitted intermittently. The optical splitter 140 combines the upstream signals received from the ONUs 130 and outputs the combined upstream signal. The combined upstream signal is a TDM signal. The optical fiber transmission line including the access optical fiber 150 and the relay optical fiber 160 transmits the upstream signal output by the optical splitter 140. The OLT 121 in the station building 120 receives the upstream signal transmitted through the optical fiber transmission line.

As illustrated in FIG. 1, in the PON system 10, the transmission distance is extended by arranging the OLT 121 in the station building 120 on the higher layer than the original station building 110. The PON system 10 amplifies the upstream signal by backward excitation according to distribution Raman amplification in order to compensate for the increase in the optical transmission line loss caused by the extension of the transmission distance. Specifically, in the upper-layer station building 120, the Raman light source 122 outputs the excitation light, and the wavelength multiplexer/demultiplexer 123 causes the excitation light output by the Raman light source 122 to be incident to the relay optical fiber 160. The wavelength multiplexer/demultiplexer 123 is, for example, a wavelength multiplexer such as a WDM (Wavelength Division Multiplexing) filter or the like, but an optical circulator may be used.

On the other hand, the wavelength multiplexer/demultiplexer 111 arranged in the original station building 110 or in the vicinity of the station building 110 where the OLT is arranged separates and removes the excitation light not used for the distributed Raman amplification from the relay optical fiber 160 constituting the optical fiber transmission line to prevent the excitation light from being incident to the access optical fiber 150. Similarly to the wavelength multiplexer/demultiplexer 123, the wavelength multiplexer/demultiplexer 111 is, for example, a wavelength demultiplexer such as a WDM filter, but an optical circulator may be used. Further, FIG. 1 illustrates a case where the excitation light removed by the wavelength multiplexer/demultiplexer 111 is output to the optical terminator 112 and the removed excitation light is terminated by the optical terminator 112, but the optical terminator 112 may be removed. According to this configuration, it is possible to prevent the problem that the excitation light is incident to the access optical fiber 150 and the Raman-amplified multiple-reflection light becomes interference noise and deteriorates the SNR of the received signal.

Second Embodiment

In the first embodiment, the excitation light not used for the distributed Raman amplification is removed and the removed excitation light is terminated in the original station building or in the vicinity thereof. In the present embodiment, the excitation light not used for the distributed Raman amplification is incident again to the original relay optical fiber. Hereinafter, the differences from the first embodiment will be mainly described.

Figure 2:
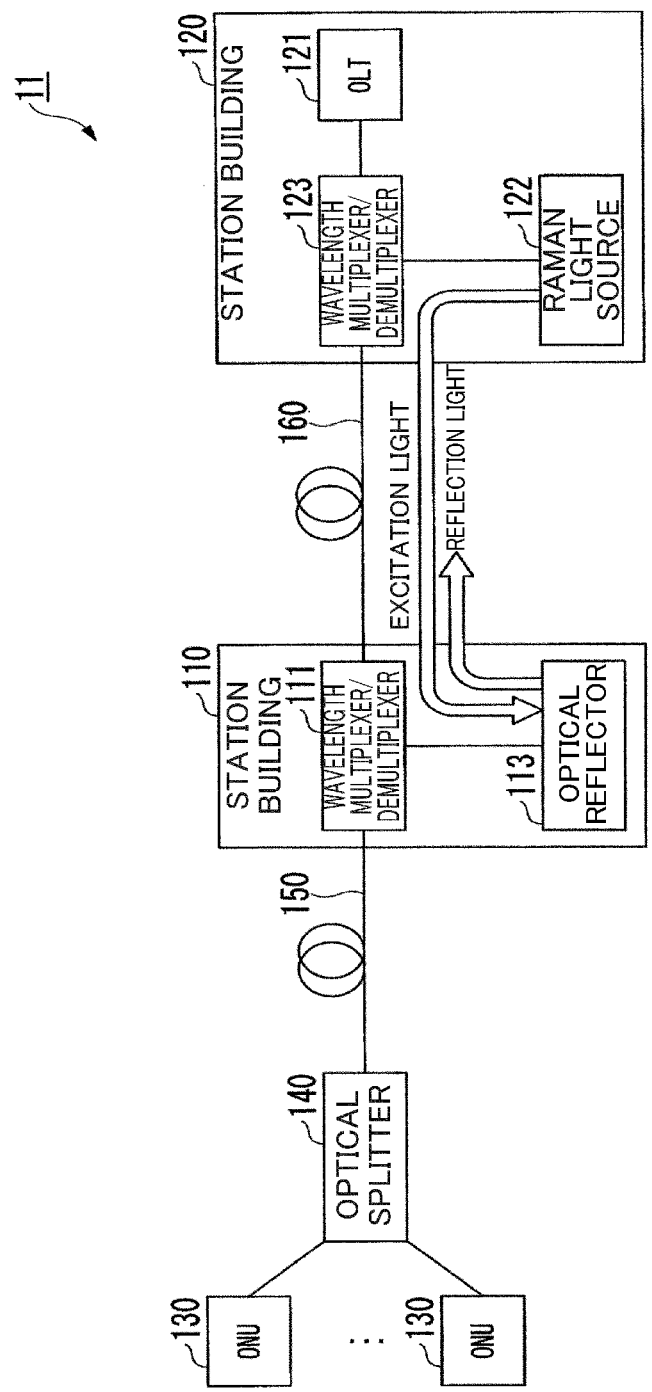
FIG. 2 is a diagram illustrating a configuration of a PON system according to a second embodiment.

FIG. 2 is a diagram illustrating a configuration of a PON system 11 according to a second embodiment of the present invention. As in FIG. 4, the PON system 11 extends the reach of a PON system by utilizing the existing access optical fiber 950 laid to provide an optical line service by the PON system 90 illustrated in FIG. 3, for example. In FIG. 2, the same parts as those of the PON system 10 according to the first embodiment illustrated in FIG. 1 are designated by the same reference numerals, and the description thereof will be omitted. The difference between the PON system 11 illustrated in FIG. 2 and the PON system 10 illustrated in FIG. 1 is that an optical reflector 113 is provided instead of the optical terminator 112.

Similarly to the PON system 10 illustrated in FIG. 1, in the PON system 11, the excitation light removed from the optical fiber transmission line is reflected by the optical reflector 113 and is incident again to the original relay optical fiber 160. That is, in the station building 120, the Raman light source 122 outputs the excitation light, and the wavelength multiplexer/demultiplexer 123 causes the excitation light output by the Raman light source 122 to be incident to the relay optical fiber 160. The wavelength multiplexer/demultiplexer 111 separates the excitation light not used for the distributed Raman amplification from the relay optical fiber 160. The optical reflector 113 reflects the excitation light separated by the wavelength multiplexer/demultiplexer 111. The wavelength multiplexer/demultiplexer 111 causes the excitation light reflected by the optical reflector 113 to be incident to the relay optical fiber 160. According to this embodiment, since the reflected light from the optical reflector 113 acts as the forward excitation light of Raman amplification with respect to the upstream signal, a larger Raman amplification gain can be obtained.

According to the above-described embodiment, the OLT arranged in the original station building is removed from the PON system that provides an optical line service to a plurality of subscribers, and the OLT arranged in the station building on the higher layer than the original station building accommodates the ONUs of the subscriber's houses to construct a long-reach PON system. In this way, the transmission distance is extended by arranging the OLT in the upper-layer station building. In order to compensate for the increase in the optical transmission line loss caused by this, the excitation light for amplifying the upstream signal by the backward excitation according to distributed Raman amplification is incident from the upper-layer station building to the optical transmission line. Then, the excitation light not used for the distributed Raman amplification is separated from the optical transmission line by a wavelength multiplexer/demultiplexer arranged in the vicinity of the original station building or by an optical circulator. Alternatively, the excitation light separated from the optical transmission line by the wavelength multiplexer/demultiplexer or an optical circulator is reflected by the optical reflector and is incident again to the original optical transmission line.

According to the above-described embodiment, even in an optical fiber transmission line in which a connection point serving as a reflection point is present, distributed Raman amplification can be applied without deteriorating the SNR of the received optical signal. Therefore, it is possible to realize a long-reach PON system utilizing the existing access optical fiber. Further, according to the present embodiment, in the long-reach PON system with an extended transmission distance, it is possible to significantly reduce the rush operation associated with the maintenance work in the event of an OLT failure.

According to the above-described embodiment, the optical communication system includes a first optical communication device and a second optical communication device, and the first optical communication device and the second optical communication device transmit and receive an optical signal via an optical transmission line. For example, the optical communication system is the PON system 10 or 11, the first optical communication device is the ONU 130 (a terminating device), and the second optical communication device is the OLT 121 (a terminal device). The optical transmission line includes a first section optical transmission line connected to a plurality of first optical communication devices via an optical splitter, and second section optical transmission line connected to a second optical communication device. The second section optical transmission line has fewer reflection points of optical signals than the first section optical transmission line. For example, the first section optical transmission line is the access optical fiber 150 connected to the first optical communication device via an optical splitter, and the second section optical transmission line is the relay optical fiber 160.

The optical communication system includes a light source, an incident portion, and a separating portion. For example, the light source is the Raman light source 122, the incident portion is the wavelength demultiplexer (the wavelength multiplexer/demultiplexer 123) or an optical circulator, and the separating portion is the wavelength multiplexer/demultiplexer 111. The incident portion causes the excitation light output from the light source to be incident to the second section optical transmission line and performs distributed Raman amplification on the optical signal. The separating portion separates the excitation light that is caused to be incident by the incident portion and transmitted in the direction of the first section optical transmission line through the second section optical transmission line.

The optical communication system may further include an optical reflecting portion and a reflection light incident portion. For example, the optical reflecting portion is the optical reflector 113, and the reflection light incident portion is the wavelength multiplexer (the wavelength multiplexer/demultiplexer 111) or an optical circulator. The optical reflecting portion reflects the excitation light separated by the separating portion. The reflection light incident portion causes the excitation light reflected by the optical reflecting portion to be incident to the second section optical transmission line.

Further, the terminal device is connected to an optical transmission line obtained by extending the reach of the first section optical transmission line using the second section optical transmission line after the original terminal device which is connected to the first section optical transmission line and which transmits and receives an optical signal to and from a plurality of terminating devices via the first section optical transmission line is removed. In addition, the separating portion may be arranged in the first station building or in the vicinity of the first station building where the removed original end station device was installed. The second optical communication device, the light source, and the incident portion are arranged in the second station building on the higher layer than the first station building. For example, the first station building is the station building 110, and the second station building is the station building 120.

While the embodiment of the present invention has been described with reference to the drawings, a specific configuration is not limited to the embodiment and the present invention embraces changes in design within the scope of the present invention.

REFERENCE SIGNS LIST

10, 11, 90, 91, 92 PON system
110, 120, 910, 920 Station building
111, 123, 923 Wavelength multiplexer/demultiplexer
112 Optical terminator
113 Optical reflector
121, 911, 921 OLT
122, 922 Raman light source
130, 930, 931 ONU
140, 940 Optical splitter
150, 950 Access optical fiber
160, 960 Relay optical fiber
970 Optical fiber transmission line

The invention claimed is:

1. An optical communication system in which a first optical communication device and a second optical communication device transmit and receive an optical signal via an optical transmission line,
   the optical transmission line including:
   a first section of the optical transmission line connected to the first optical communication device; and
   a second section of the optical transmission line connected to the second optical communication device and having fewer reflection points of the optical signal than the first section of the optical transmission line, and
   the optical communication system further comprising:
   a Raman light source;
   an incident device connected to same end of the second section of the optical transmission line as the second optical communication device, where the incident device causes excitation light output from the Raman light source to be incident to the second section of the optical transmission line and performs distributed Raman amplification on the optical signal; and
   a separating device interconnecting the first section of the optical transmission line to the second section of the optical transmission line, wherein the separating device separates the excitation light that is caused to be incident by the incident device and transmitted through the second section of the optical transmission line in a direction of the first section of the optical transmission line.

2. The optical communication system according to claim 1, further comprising:
   an optical reflecting device that reflects the excitation light separated by the separating device to be incident on the second section of the optical transmission line.

3. The optical communication system according to claim 1, wherein the separating device is a wavelength demultiplexer or an optical circulator.

4. The optical communication system according to claim 1, wherein
   the first optical communication device is a terminating device, the second optical communication device is a terminal device.

5. The optical communication system according to claim 1, wherein the first section of the optical transmission line is connected to a plurality of the terminal devices via an optical splitter.

6. An optical communication method in an optical communication system in which a first optical communication device and a second optical communication device transmit and receive an optical signal via an optical transmission line,
   the optical transmission line including:
   a first section of the optical transmission line connected to the first optical communication device; and
   a second section of the optical transmission line connected to the second optical communication device and having fewer reflection points of the optical signal than the first section of the optical transmission line, comprising:
   an incident step of causing excitation light output from a Raman light source to be incident to the second section optical transmission line and performing distributed Raman amplification on the optical signal; and a separating step of separating the excitation light that is caused to be incident in the incident portion and transmitted through the second section optical transmission line in a direction of the first section optical transmission line.

\* \* \* \* \*